US008166870B2

(12) United States Patent
Badin (10) Patent No.: US 8,166,870 B2
(45) Date of Patent: May 1, 2012

(54) MOBILE APPARATUS PROVIDED WITH A SURFACE FOR COOKING BY CONTACT

(75) Inventor: Roberto Badin, Villotta di Chions (IT)

(73) Assignee: Smartech Italia S.p.A. (IT)

( * ) Notice: Subject to any disclaimer, the term of this patent is extended or adjusted under 35 U.S.C. 154(b) by 1219 days.

(21) Appl. No.: 10/592,247

(22) PCT Filed: Mar. 21, 2005

(86) PCT No.: PCT/IB2005/000725
§ 371 (c)(1),
(2), (4) Date: Sep. 8, 2006

(87) PCT Pub. No.: WO2005/092163
PCT Pub. Date: Oct. 6, 2005

(65) Prior Publication Data
US 2007/0196552 A1 Aug. 23, 2007

(30) Foreign Application Priority Data

Mar. 24, 2004 (IT) .............................. PN2004A0022

(51) Int. Cl.
G07F 9/10 (2006.01)
A47J 37/07 (2006.01)
A47J 37/00 (2006.01)
F24B 3/00 (2006.01)
F24B 1/20 (2006.01)
F24C 1/16 (2006.01)

(52) U.S. Cl. ............. 99/357; 99/339; 99/449; 126/25 R; 126/41 R (58) Field of Classification Search .................... 99/357, 99/339, 340, 422, 449, 447; 126/305, 40, 126/304 R, 41 R, 38, 39 C, 39 H, 39 J, 39 K, 126/39 L, 39 M, 39 N, 25 R, 9 R; D7/332, D7/333, 334, 335
See application file for complete search history.

(56) References Cited

U.S. PATENT DOCUMENTS

| 150,222 | A | * | 4/1874 | Beaumont ....................... 16/445 |
| 499,128 | A | * | 6/1893 | Loewenthal ..................... 126/38 |
| 604,342 | A | * | 5/1898 | Weber et al. ................. 126/25 R |
| 1,437,812 | A | * | 12/1922 | MacMillan ..................... 126/38 |
| 1,485,292 | A | * | 2/1924 | Popper .......................... 422/300 |
| 2,304,140 | A | * | 12/1942 | Bergholm ................... 126/39 G |
| 2,502,434 | A | * | 4/1950 | Creitz .......................... 126/266 |
| 3,327,698 | A | * | 6/1967 | Leslie ......................... 126/25 R |
| 3,593,647 | A | * | 7/1971 | Copeland, Jr. .................. 99/339 |
| 3,765,397 | A | * | 10/1973 | Henderson .................. 126/25 R |
| 3,915,144 | A | * | 10/1975 | Tomita .......................... 126/9 R |
| 4,108,142 | A | * | 8/1978 | Barson et al. ................ 126/41 R |
| 4,188,937 | A | * | 2/1980 | Baynes ........................ 126/41 R |
| 4,216,760 | A | * | 8/1980 | Wiggins ........................ 126/508 |
| 4,553,524 | A | * | 11/1985 | Wheat et al. ................. 126/25 R |
| 4,581,989 | A | * | 4/1986 | Swartley ........................ 99/346 |

(Continued)

*Primary Examiner* — Tu B Hoang
*Assistant Examiner* — Hemant Mathew
(74) *Attorney, Agent, or Firm* — James E. Walton; Richard G. Eldredge (57) ABSTRACT

Apparatus (20) for cooking food by contact comprising a continuous cooking surface (26) heated on its underside by one or more gas burners (33) which are housed in one or more combustion chambers (25) and which are supplied with fuel gas by a portable tank (B). The continuous cooking surface (26), the combustion chambers (25), the burners (33) and the valvular means (34) constitute a cooking unit (21) that is removably mounted on a supporting cart (22) suited to house said portable tank (B) and to allow the use of the apparatus (20) either in an indoor or in an outdoor environment.

9 Claims, 9 Drawing Sheets

U.S. PATENT DOCUMENTS

| | | | | |
|---|---|---|---|---|
| 4,587,947 A | * | 5/1986 | Tomita | 126/25 R |
| 4,909,235 A | * | 3/1990 | Boetcker | 126/9 R |
| 4,922,079 A | * | 5/1990 | Bowen et al. | 219/415 |
| 5,086,752 A | * | 2/1992 | Hait | 126/9 R |
| 5,163,358 A | * | 11/1992 | Hanagan et al. | 99/339 |
| 5,218,950 A | * | 6/1993 | Hait | 126/9 R |
| 5,257,616 A | * | 11/1993 | Koziol | 126/43 |
| 5,359,988 A | * | 11/1994 | Hait | 126/25 R |
| 5,413,087 A | * | 5/1995 | Jean | 126/41 R |
| D361,466 S | * | 8/1995 | Peterson et al. | D7/334 |
| 5,797,386 A | * | 8/1998 | Orr | 126/25 R |
| 6,065,466 A | * | 5/2000 | Baykal | 126/41 R |
| 6,213,006 B1 | * | 4/2001 | Reardon et al. | 99/446 |
| 6,314,955 B1 | * | 11/2001 | Boetcker | 126/9 R |
| 6,543,435 B1 | * | 4/2003 | Regen et al. | 126/25 R |
| 6,546,851 B1 | * | 4/2003 | Osborne | 99/449 |
| 6,557,545 B2 | * | 5/2003 | Williams | 126/25 R |
| 2002/0020405 A1 | * | 2/2002 | Coleman et al. | 126/41 R |
| 2003/0106546 A1 | * | 6/2003 | Wu | 126/41 R |

\* cited by examiner

MOBILE APPARATUS PROVIDED WITH A SURFACE FOR COOKING BY CONTACT

The present invention pertains to a mobile apparatus provided with a surface for indoor/outdoor cooking food by direct contact.

In particular, the present invention relates to a new mobile apparatus provided with a continuous surface for cooking food by contact which can be advantageously used either in an indoor or in an outdoor environment and which permits to broaden, in both household and professional environment, the possibility of carrying out a cooking process that has been practiced up to now, exclusively with stationary apparatuses and for professional cooking purposes.

In recent years, the consumers have increased the use of appliances for cooking food by direct contact with an heating source which can be heated by charcoal, by gas or electricity.

The cooking surface is generally formed by a rectangular or circular metallic grill from welded rods or by a single metallic plate provided with through holes or openings for supporting food to be cooked.

Such types of grills present the following drawbacks.

It is to be pointed out that foods cooked on grills made of bars or rods tend to disperse their nutrients because the working temperatures and the poor value of the contact surface between the food and the cooking grill do not promote the formation of that pellicular crust which retains the nutrients inside the food.

Another disadvantage of the conventional grills is that they do not allow an healthy and balanced cooking of the food because they do not provide a device for draining excess grease and liquids coming from the food during the cooking process.

In particular, a portion of said grease and liquids drips from the food, falls on the heating source and creates uncontrolled flames which not only constitute an hazard for the person and for the environment but also modify the taste and flavor of the cooked food.

A remaining portion of said secretions remains on the surface of the food causing its boiling at first, then its burning and at last its carbonization with the relevant evolvement of harmful substances and unpleasant odors.

Another disadvantage caused by the absence of a drainage and fat collecting devices is that it makes difficult, time consuming and tiring the periodical cleaning and maintenance operations of the cooking grills.

In fact, cleaning of the grills requires a very laborious and vigorous manual action, often by means of a metallic brush, in order to remove the oil and grease residues which are encrusting their reticular structure. The residues, if not removed, can impart undesired and unpleasant flavor onto the food cooked during the next cooking processes.

It is also to be considered the fact that the grills from welded metal rods are susceptible to rust and corrosion and have a relatively short useful life.

As a consequence, the user is forced to replace the original grills looking for a new grill in a replacement market which is offering spare parts with sorted sizes and varied shapes.

The cleaning operations are also complicated by the fact that intermediate heat distribution devices, such as lava rocks or plates made of thermoconductive material, may be interposed between the heat source and the cooking surface in order to more uniformly distribute the heat but they also catch a majority of the secretions coming from food being cooked. If said heat distribution devices are not periodically cleaned or replaced, all unwanted odors and vapors of previous cooking will be returned to the food during the next cooking. In addition, the traditional grills have the disadvantage that many foods, such as fish and fresh vegetables, break apart easily during cooking and fall onto the heat source through the openings of the grill net.

The cooking surfaces formed from a single piece of metal and provided with a plurality of through holes or elongated slots have the disadvantage to be necessarily made with a reduced thickness so as to not complicate their working process, and therefore they are susceptibles to warp under exposure to temperature variations.

After a short period of use, also this type of grills will not be able to support food to be cooked and they also will suffer cleaning problems described above.

Cooking surfaces used for cooking by contact in professional kitchens of fast food restaurants and full-time chain restaurants are well known in the art.

Typically, such appliances consist of a quadrangular metal plate of various sizes which is electrically or fuel heated from the lower part and which returns heat from the upper part where it is made as a cooking surface.

Generally, such plates have a width of from about 30 cm. to about 90 cm., an horizontal depth of from about 40 cm. to about 80 cm. and have a supporting structure that is sufficiently sturdy to support the cooking plate together with the heating elements and all the devices for controlling the temperature variations which occur in the body of the cooking plate.

Such cooking appliances present the following drawbacks.

The periodical inspecting, repairing and maintenance operations of such type of appliances are complicated by the fact that they usually require more than one operator for moving the entire cooking plate or to disassembling a part or the entire apparatus to permit access to the device to be controlled.

The known cooking grills with a rectangular shape, have the disadvantage that they do not facilitate cleaning of the corner zones and do not ensure a uniform heat distribution within the entire cooking surface because there is more heat transfer at the points of heating elements contact than at other zones of the cooking plate.

In fact, such cooking plates have a 50-70° degree C. temperature variation between the zone close to the heating sources and the zones located away from the heating sources. As a result, if the user applies heat to cold areas further overheats hot areas, or vice-versa.

Finally, the cooking plates known in the prior art are not designed to be used either in an indoor or in an outdoor environment.

This limitation is more particularly felt in all those restaurants offering inner banqueting-rooms, which are located close to the kitchens and which can be easily reached by the waiters, as well as open locations, i.e. roof gardens, terraces or outdoor-swimming pools, which are far away from the kitchens. In this latter case, the waiters are forced to run quickly between the kitchen and the open-air tables in order to minimize the cooling of the food to be served.

It is, therefore, a principal object of the present invention to solve the above stated drawbacks by means of a mobile apparatus provided with a surface for indoor/outdoor cooking food by direct contact.

Another important object of the present invention is to provide an apparatus of the above type which can be easily used in household environment and by not professional users for carrying out a cooking process that has been practiced up to now, exclusively in professional kitchens and which allows to carry out the inspecting, servicing and maintenance operations of the apparatus in a more simple and rational way as compared to the known commercial cooking plates.

It is a further object of the present invention to provide a cooking appliance with a cooking plate that provides a uniform distribution of heat over the entire cooking surface and that permits the user to divide the cooking surface into separate temperature zones, if desired.

A further object of the present invention is to provide an appliance with a cooking surface that minimizes the formation of surface encrustments and facilitates cleaning operations.

These and other objects are attained according to the invention by a mobile apparatus provided with a surface for cooking food by contact and having the hereinafter claimed features.

The objects and the features of the apparatus according to the invention will appear clear from the following description with reference to the accompanying schematic drawing, wherein:

the FIG. 1 is a frontal perspective view of an embodiment of the apparatus according to the present invention;

the FIG. 2 shows a side perspective view of the apparatus of FIG. 1;

the FIG. 3 is a front/top view of the apparatus with its housing in closed position;

the FIG. 4 is a front/top view of the apparatus with its housing in open position;

the FIG. 5 is a side view of the apparatus shown in FIG. 4;

the FIG. 6 is a top view of the cooking surface incorporated in the apparatus of FIG. 4;

the FIG. 7 is an exploded view of the main components of the cooking unit in a preferred embodiment of the apparatus according to the present invention;

the FIG. 8 is an exploded view of the main components of the cooking unit in an alternate embodiment of the apparatus according to the present invention;

the FIG. 9 is an exploded longitudinal sectional view of the main components of the cooking unit shown in the FIG. 7;

the FIG. 10 shows a longitudinal sectional view of the same components of the FIG. 9 in assembled position;

the FIG. 11 illustrates an exploded longitudinal sectional view of the main components of the cooking unit shown in the FIG. 8;

the FIG. 12 shows a longitudinal sectional view of the same components of the FIG. 11 in assembled position;

the FIG. 13 is a top view of the cooking surface of the apparatus according to the present invention;

the FIG. 14 is an enlarged detail of the draining device of the cooking surface;

the FIGS. 15 and 16 are frontal perspective views of the apparatus according to the present invention.

The description and the drawings refer to a non-limiting example of an apparatus according to the invention which is generally represented by the reference numeral 20. The components of the apparatus 20 illustrated in the drawings are identified by reference numerals which remain the same for like or identical parts.

The apparatus 20 according to the invention substantially comprises a cooking unit 21 which is mounted on a supporting cart 22 movable on wheels 23.

The cooking unit 21 substantially presents a shape of a truncated cone and comprises a cooking surface 26 having a substantially circular shape, at least one inner combustion chamber 25 and an outer casing 24.

The supporting cart 22 is preferably made of stainless steel and substantially formed by an upper annular element 27 and a lower disk-shaped plate 28 which are rigidly connected together by means of a plurality of vertical stanchions 29.

A circular handle 35 is fixed to the upper annular element 27 to facilitate the manual movementation of the cart 22.

Figure 16:
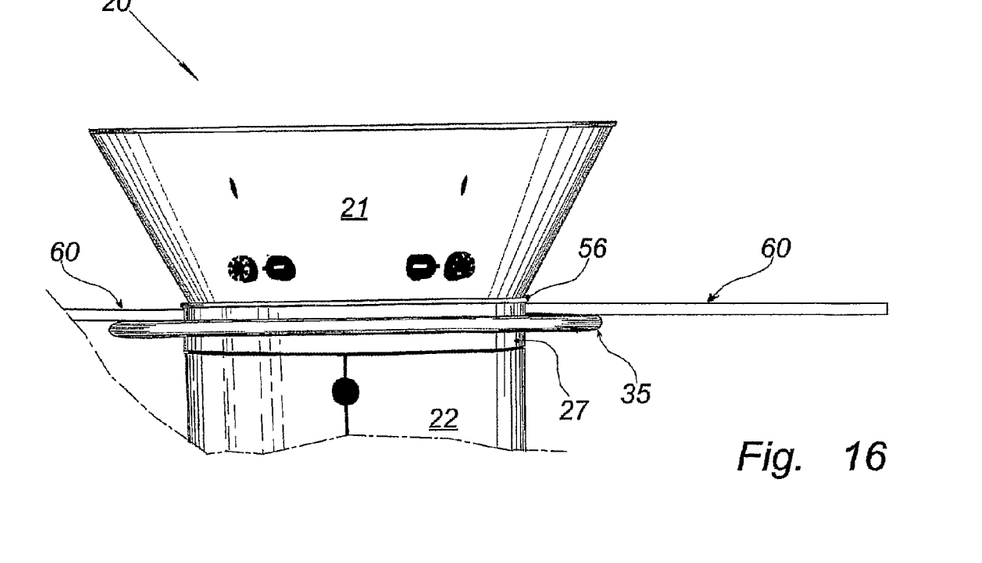

The circular handle 35 allows for hanging cooking utensils, such as a spade, a spatula or a fork which are normally used for cooking purposes, as well as for supporting petal-shaped trays 60 (FIG. 16).

Such trays 60 are made from a composite material (as for example the material characterized by the trademark CORIAN® a denomination of E. I. du Pont de Nemours and Company) or from a tempered crystal and are appropriately shaped to stuck, with their inner curvilinear edge 61, between the protruding rim 56 of the upper annular element 27 of the cart 22 and the upper surface of the circular handle 35 (FIG. 17).

In the present embodiment of the cooking apparatus, the lower plate 28 is connected to four wheels 23 mounted at the ends of a spider but it can alternatively be connected to a three wheels cart or to similar supporting devices.

The circular cooking surface 26 is preferably made from metallic material (for example steel) having a thickness sufficient to provide the thermal inertia required by the cooking process.

In particular, it is preferred the use of a polished steel plate having a thickness in the range of from approximately 12 mm. to approximately 15 mm.

In a well known manner, the upper side of the cooking surface 26 is electroplated with a layer of chromium which has an average thickness of about 50 micron and with a diamond-pyramid hardness (Vickers) number of about 1000 HV.

The upper side of the cooking surface 26 is polished so as to minimize the surface roughness to a value of 0.1 micron.

Such type of mirror finish improves the anti-sticking properties of the cooking surface 26, facilitates the operations for cleaning the cooking surface and reduces the amount of infrared radiation that is radiated into the environment surrounding the cooking apparatus and emitted in the direction of the user.

In this way, there are advantageously no overheating of the environment surrounding the cooking apparatus as well as of the person attending to the cooking process.

Moreover, the layer of chromium coating keeps heat in the outermost layer of the cooking surface 26 and ensures a constant surface temperature which is adequate for cooking food, thereby consuming an amount of energy which is less than that required by the traditional cooking plates.

It is also to be pointed out that the cooking surface 26 is inclined from the rear end to the front end, at an angle ranging from 1° degree to 2° degrees with respect to a horizontal plane, and presents a recess 30 in its front edge for reasons that will be explained later.

Figure 6:
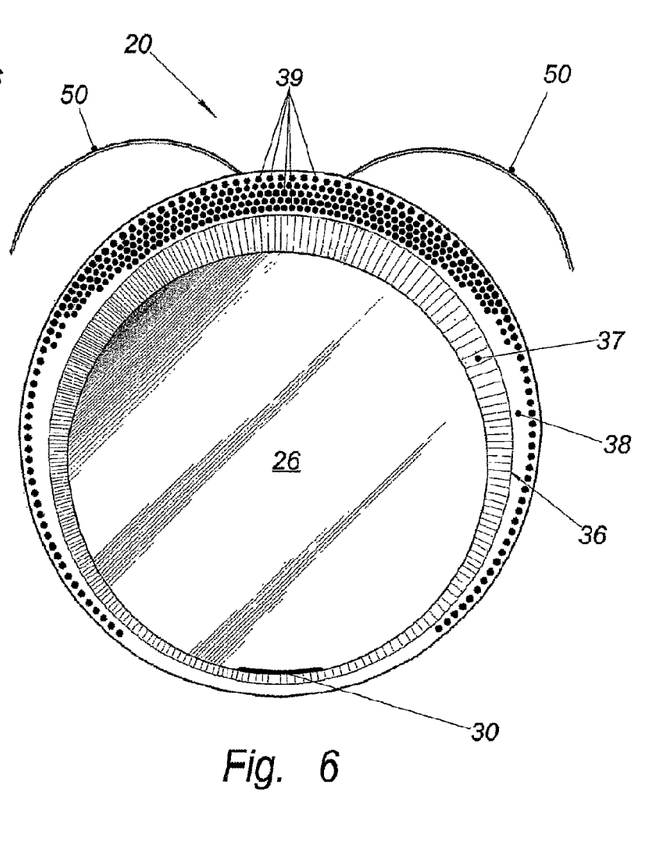

With particular reference to the FIG. 6, the cooking surface 26 is associated, for example by welding, with a peripheral raised frame 36 which is formed by a inner strip 37 which is obliquely raising from the surface 26 and by an outer strip 38 which is substantially horizontal.

In the rear arch of the peripheral frame 36, said outer strip 38 includes a plurality of through holes 39 having a function which will be described hereinafter.

Figure 7:
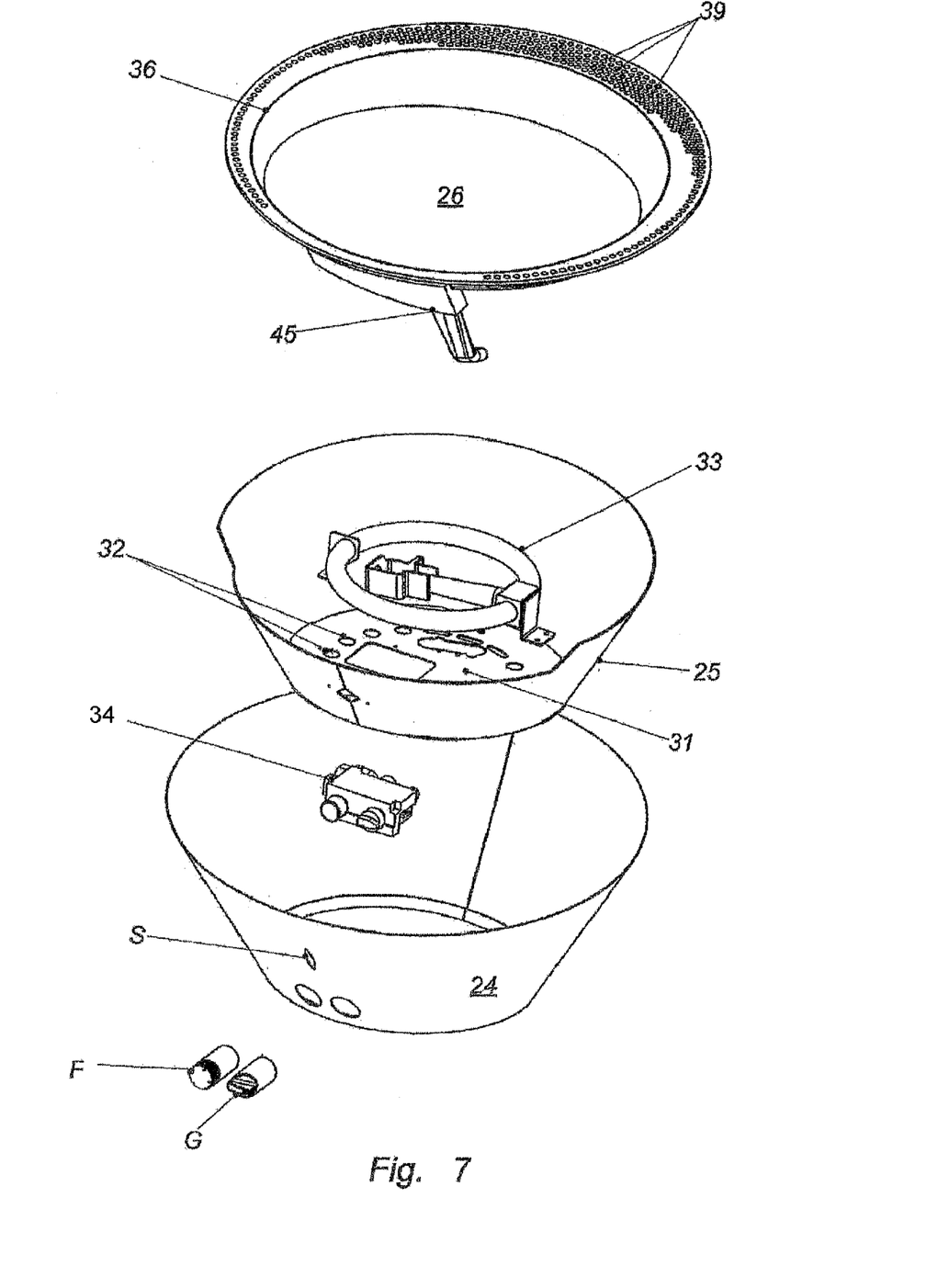
Figure 9:
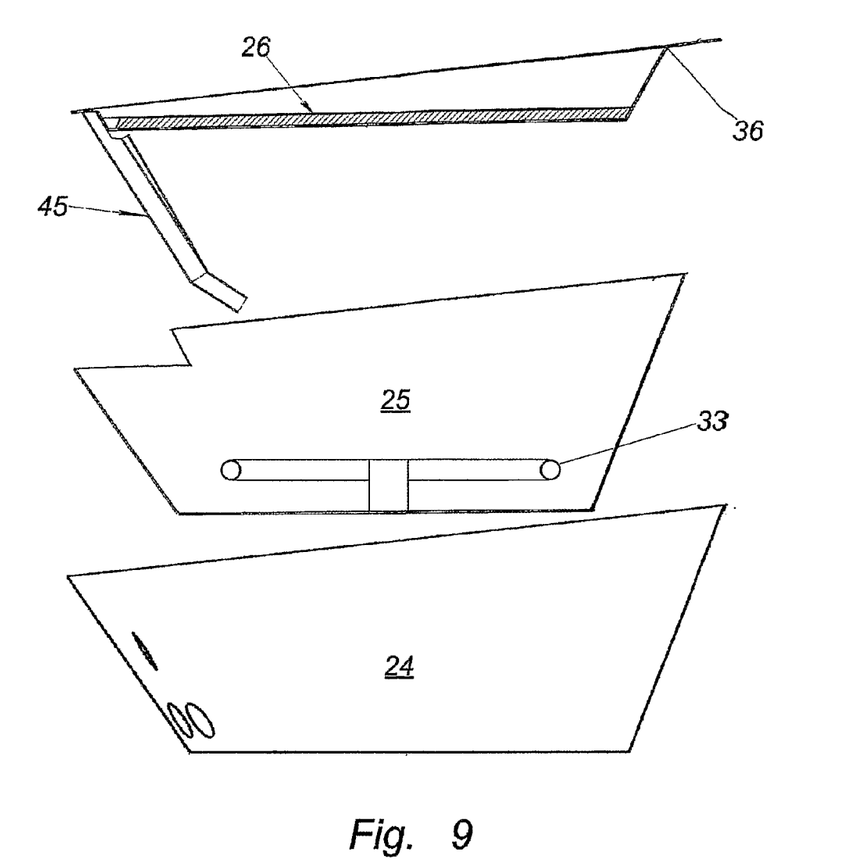
Figure 10:
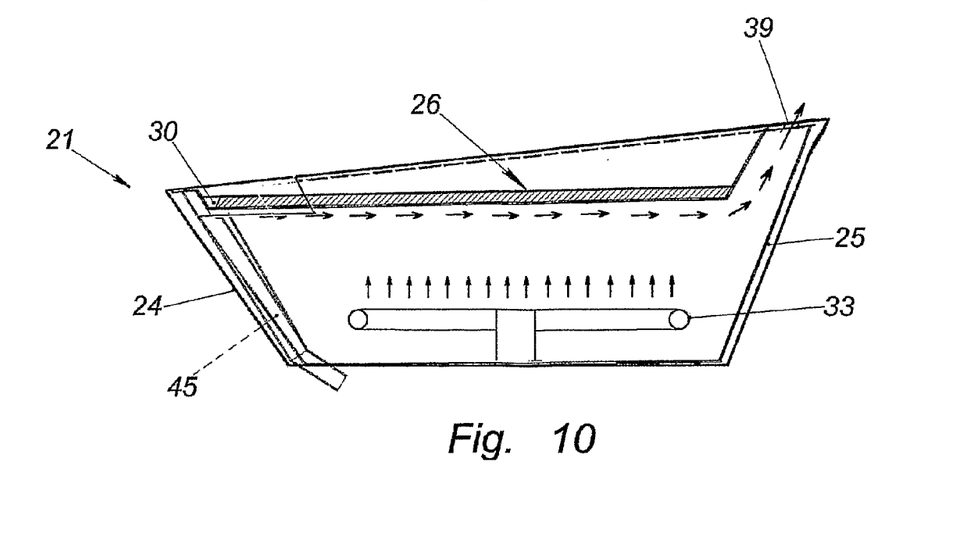

In the exemplary embodiment of cooking unit 21 shown in the FIGS. 7, 9 and 10, only one combustion chamber 25 is disposed under the cooking surface 26 and is preferably manufactured of stainless steel sheet.

The combustion chamber 25 is defined by a peripheral sheet having a shape of a truncated cone which at the top is closed by the cooking surface 26, and at the bottom by a bottom wall 31 provided with ventilation through holes 32.

The through holes 32 are of such size, shape and location to supply outside air to the burner 33 by a sufficient amount to allow a right gas combustion.

The combustion chamber 25 houses at least a traditional gas burner 33 which is preferably made of chromed steel with a tubular cross section extending in a substantially circular shape which is particularly well suited for providing a more uniformly heated cooling surface 26.

In a well known manner, the burner 33 is suitably fixed to the lower wall 31 of the combustion chamber 25 and it is connected to a gas valve group 34 which is housed externally to said combustion chamber 25.

The gas valve group 34 comprises two knobs F and G which respectively function for igniting the gas in said burner 33, for example by means of a conventional piezoelectric ignition, and for regulating the gas flow to the burner 33 until a predetermined temperature is reached.

The right operation of the burner 33 can be checked by the user through a view port S which is made in the outer casing 24 at a location that corresponds with an opening in the outer sheet of the combustion chamber 25.

The valve group 34 is associated with all those control devices commonly used to regulate and to watch the right operating of this type of apparatuses and sufficiently known in the art as not to require further description.

It is sufficient to say that the gas regulating knob G is not activated until a pilot light of the burner 33 is lighted.

Figure 13:
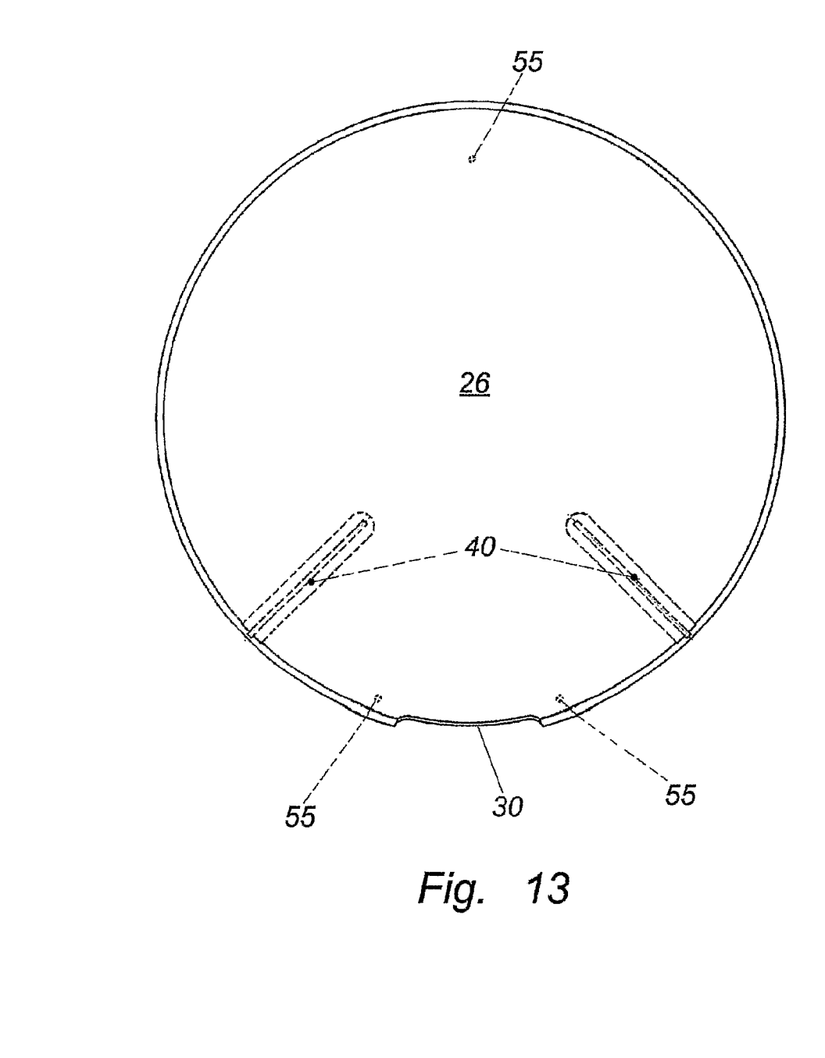

Heat sensors of well known type, such as a plurality of thermocouple sensors 40 (FIG. 13), may be associated with the cooking surface 26, for example housed in corresponding grooves provided in the body of the cooking surface 26, for sensing the difference between the temperature of the cooking surface 26 and the predetermined cooking temperature.

After igniting the pilot light, the valve group 34 provides a supply of gas to the gas burner 33 if the temperature of the cooking surface 26 is below the temperature selected by the user.

When there is a need for increasing the temperature of the cooking surface, the gas flows to the burner 33 where it is ignited by pilot light.

The gas burner 33 continues to operate until the temperature of the cooking surface 26 is below the temperature which has been predetermined by the user or until the gas regulating knob G is returned to its off position by the user.

It is obvious that the apparatus of the invention comprises automatic safety devices which are activated in the event of malfunctions, as for example the malfunctions caused by an accidental breaking of the system for supplying gas to the bummer 33.

In a well known manner, the fuel gas, such as natural gas or propane gas, is supplied by a portable gas tank B which is connected to the control valve 34 through a flexible pipe not illustrated in the drawings.

The portable gas tank B is housed on the lower disk-shaped plate 28 of the supporting cart 22 and it is secured into place by known and not described anchoring means.

A supporting shelf 43 is placed under the cooking unit 21 and it is fixed to the vertical stanchions 29 of the cart 22, for example by welding, in order to support a container 44 having a function which will be described hereinafter.

Figure 1:
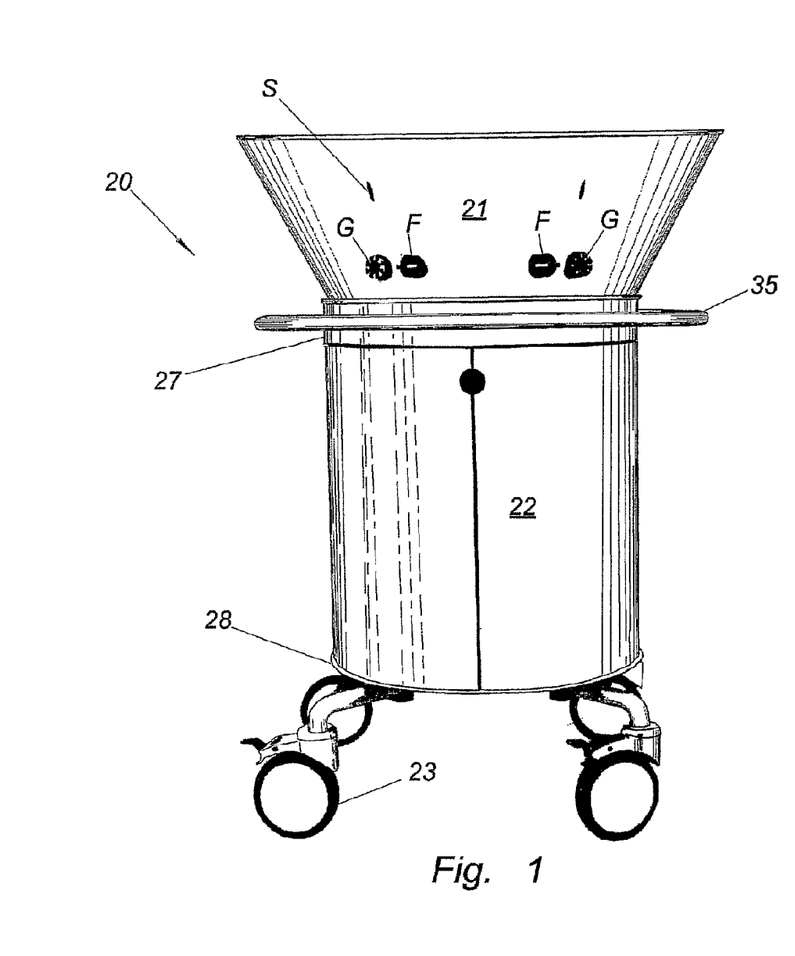
Figure 2:
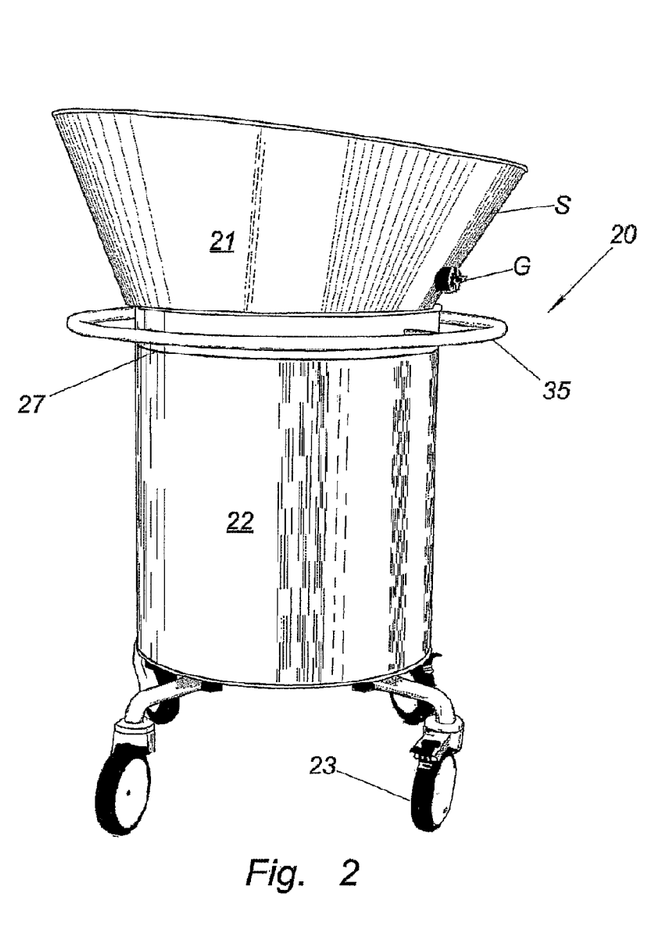
Figure 3:
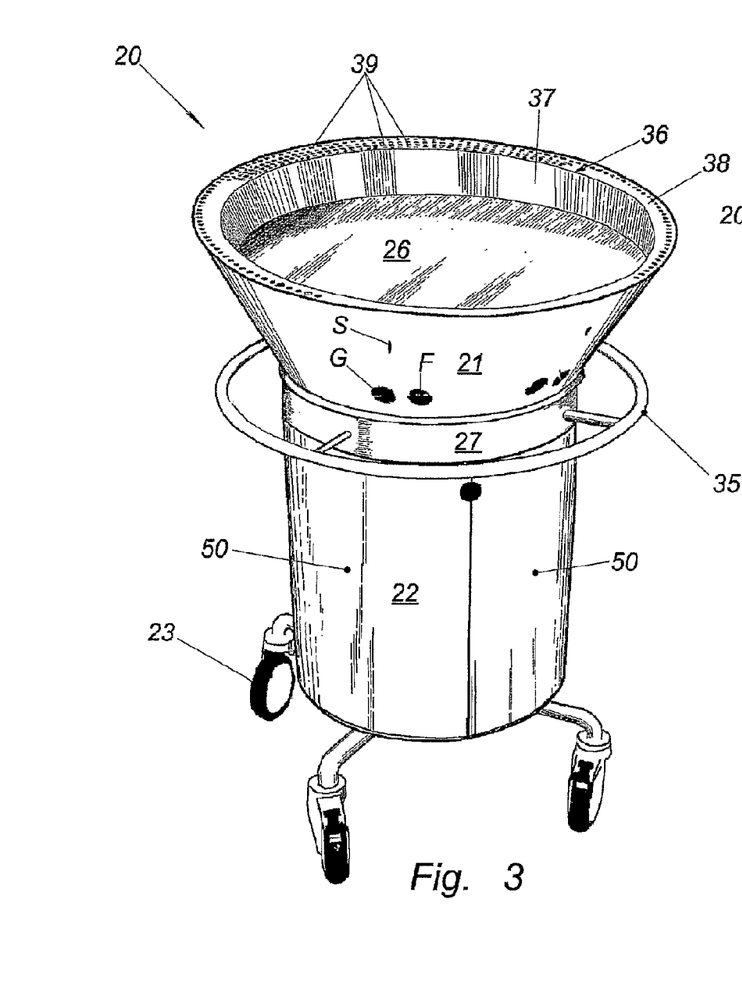
Figure 4:
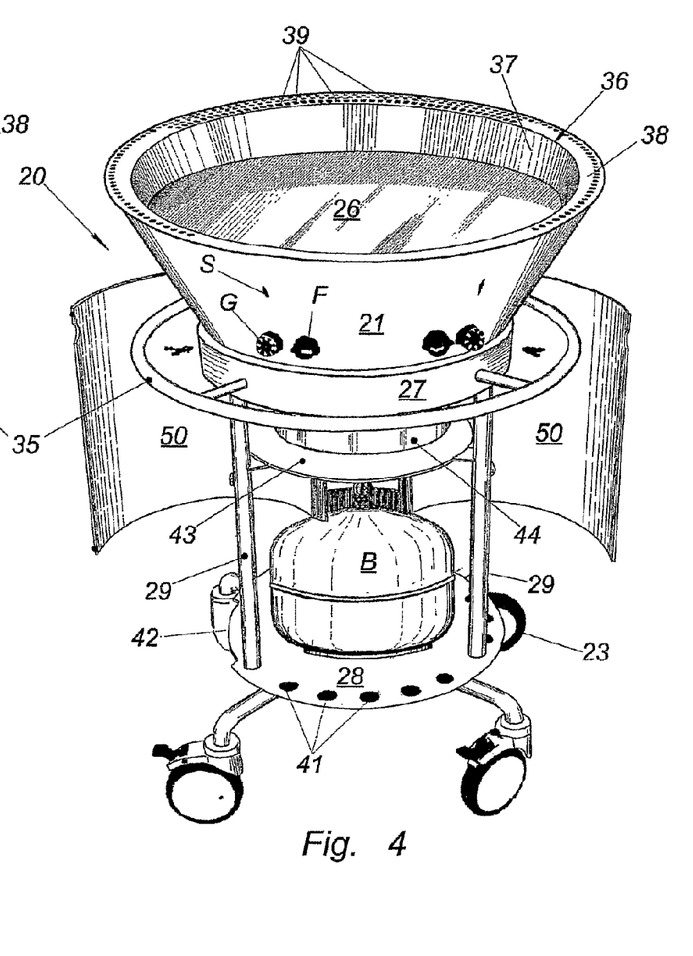

Two doors 50, having a semicircular cross section, are hingedly coupled to the upper annular element 27 and to the lower disk shaped element 28 of the cart 22 in such a way as to be movable between a closed position, wherein the doors define the cylindrical body of the cart 22 (FIGS. 1, 2 and 3), and an open position wherein they permit access to the inner shelves 28 and 43 of the cart 22 (FIGS. 4, and 6).

A plurality of through holes 41 are formed through the lower disk shaped shelf 28 of the cart 22 for allowing fresh inlet air to flow towards the burner 33 even when the doors 50 are in their closed position.

Figure 5:
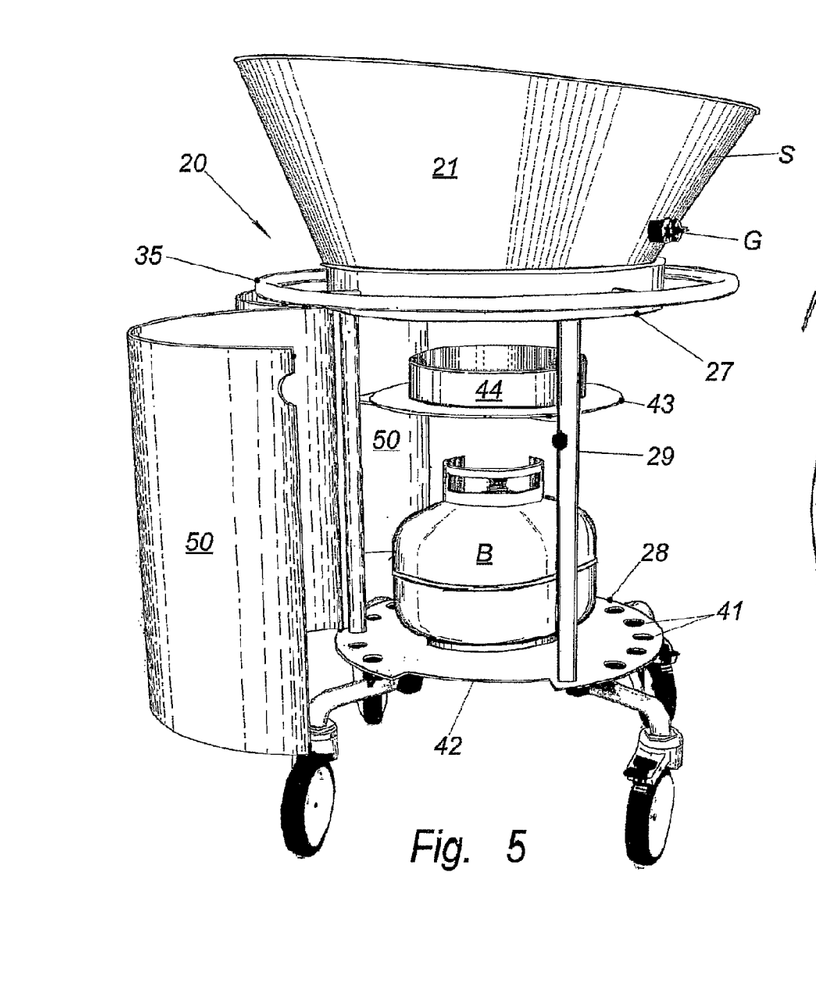

In alternate embodiment, or in combination with such ventilation openings, the peripheral edge of the shelf 28 of the cart 22 may be provided with recesses 42 as shown in the FIGS. 4 and 5.

Figure 8:
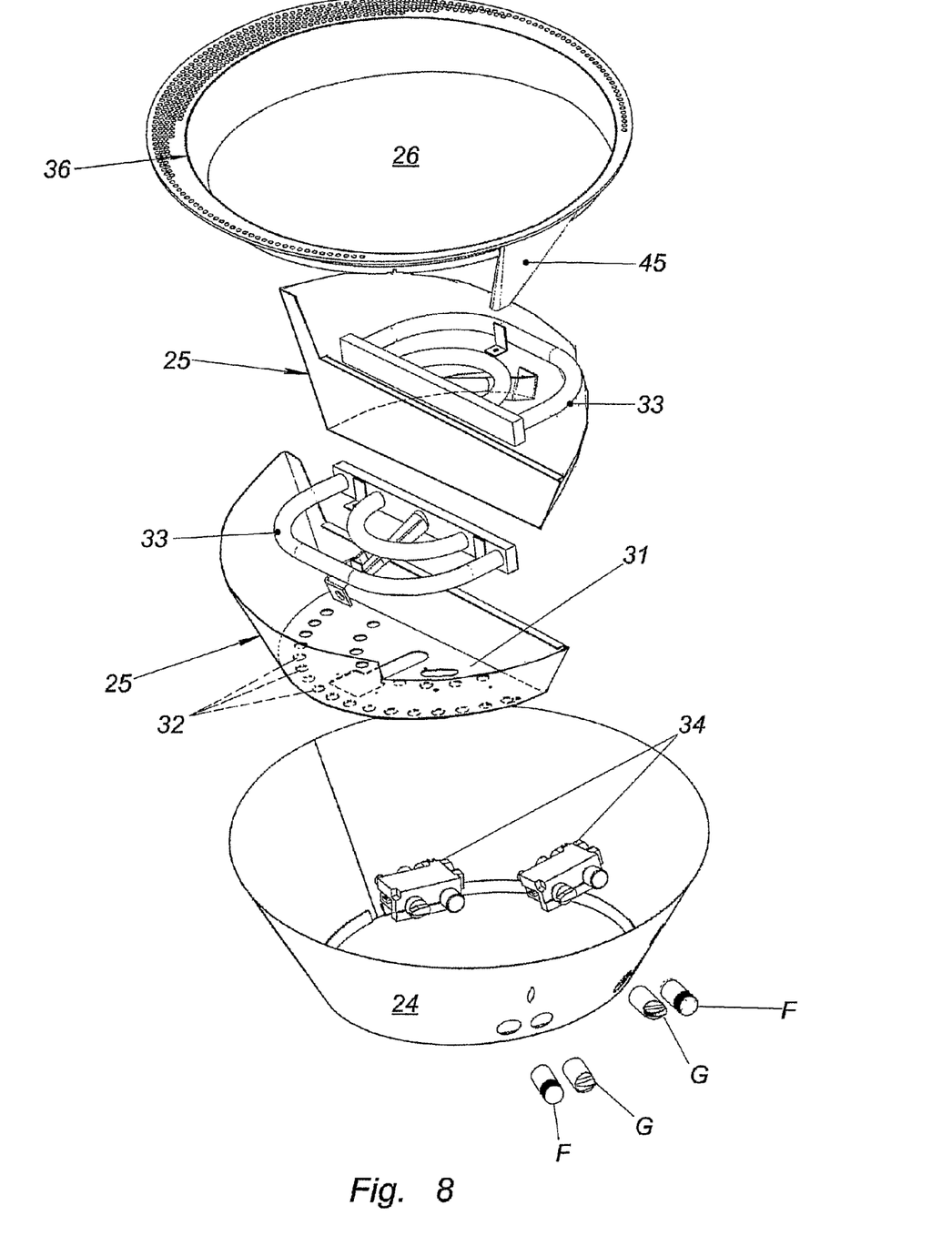
Figure 11:
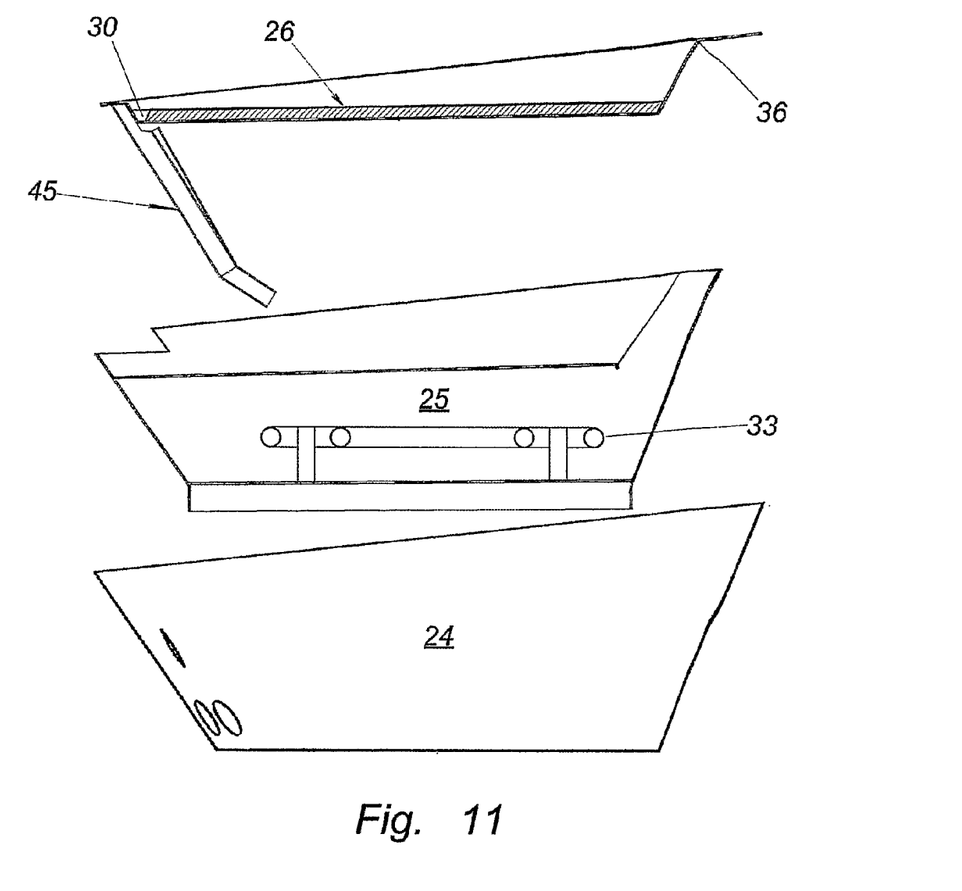
Figure 12:
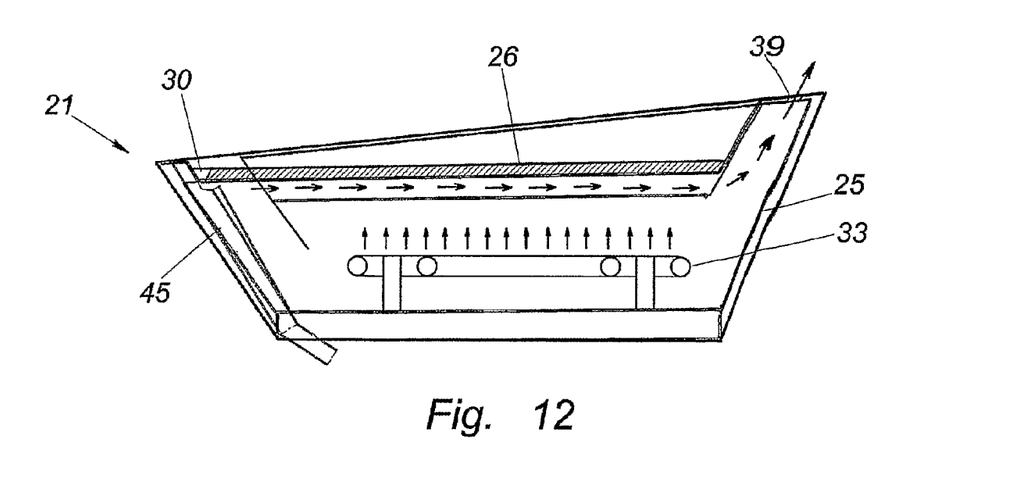

In the exemplary embodiment of the cooking unit 21 as shown in the FIGS. 8, 11 and 12, two combustion chambers 25 are disposed side by side under the cooking surface 26. At the top, the combustion chambers are closed by the cooking surface 26, and at the bottom by a wall 31 provided with a plurality of ventilation through holes 32.

Each of the combustion chambers 25 houses a corresponding gas burner 33 fabricated from a chromed steel having a tubular cross section which extends to form one or more semicircular branches which are particularly suitable to more uniformly distribute the heat within a semicircular portion of the cooking surface 26.

In this way, the apparatus according to the invention offers the possibility of heating only an half of the cooking surface 26, in the case of small quantities of foods to be cooked, or of heating the cooking surface 26 in two segments having a different surfaces temperatures, one temperature for cooking the food and the other temperature for preheating the food to be cooked or for warming the cooked food.

The hot convective air produced by the gas burners 33 within a single combustion chamber (FIG. 10) or within two combustion chambers 25 disposed side by side (FIG. 12), runs along the underside of the cooking surface 26 and exits the previously described ports 39 in the peripheral edge 36.

It is to be pointed out that the single combustion chamber 25 or the two combustion chambers 25 disposed side by side, housing one or more burners 33, are designed to be easily removed from the cart 22 and from the cooking surface 26 in the event of malfunction or of periodical inspection and maintenance operations.

In particular, simple screw systems, not shown in the drawings, connect the bottom wall 31 of the combustion chambers 25 to corresponding threaded seats 55 (FIG. 13) which are formed in the underside of the cooking surface 26.

After the simple removing of the said screw systems and the disconnection of the gas feeding pipe from the valve group 34, the combustion chamber 25 and all functional components housed thereinto, such as one or more valvular groups 34 and all the connections to the control devices which are normally used to regulate and to check the right operating of this type of cooking apparatuses 20, may be easily removed from the apparatus 20.

A collecting tube 45 is fixed to the underside of the cooking surface 26 at a location corresponding to the recess 30 in the front edge. Said collecting tube 45 extends downwardly in slant direction, it passes through an opening in the bottom of the combustion chamber 25 and it has the spout placed directly over the container 44 described above.

Figure 14:
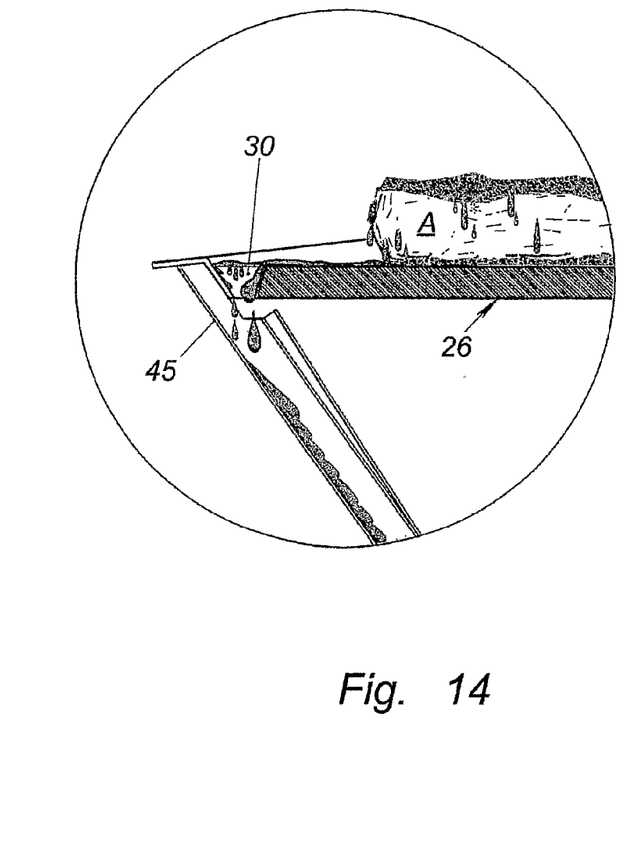
Figure 15:
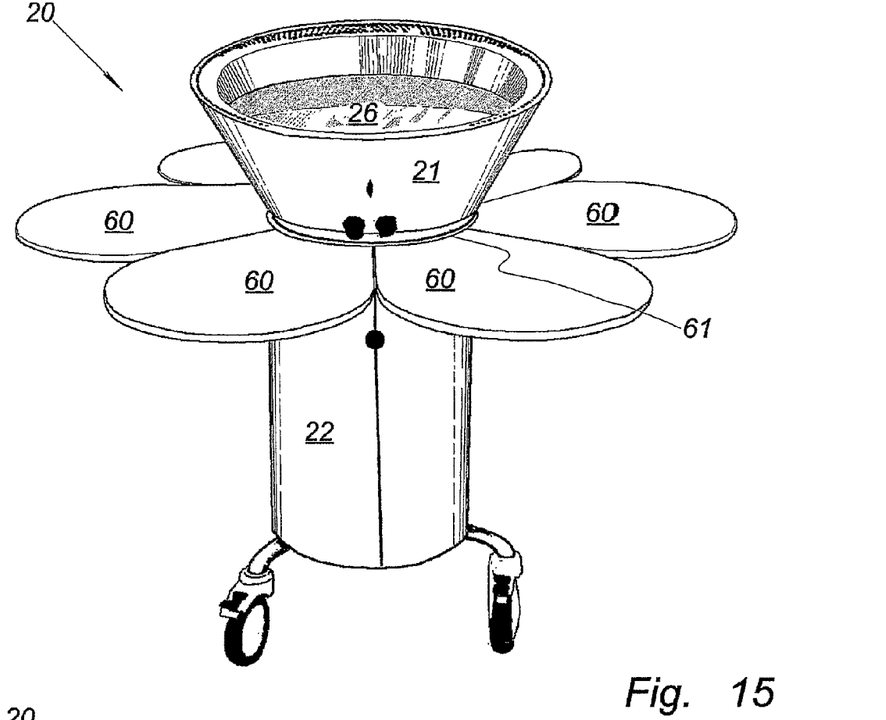

With particular reference to FIG. 14, the tube 45 is suited for collecting and for directing toward the container 44 all those fluids which come from the food A during the cooking process and run along the inclined cooking surface 26 until they reach the recess 30.

As can be seen in the enlarged detail of the FIG. 14, the edge of the recess 30 is inclined to facilitate the dripping of the fluids toward the tube 45 which directs them toward the container 44. The latter may be periodically removed from the cart 22 for cleaning up the residues collected inside it.

From what stated, it will be seen that the primary object of present invention is achieved by a mobile indoor/outdoor cooking apparatus 20 which overcomes the disadvantages associated with the known apparatuses of the prior art.

Moreover, the apparatus 20 according to the invention can be easily utilized for household cooking purposes as well as for commercial and professional cooking purposes.

In fact, the household user may utilize the apparatus 20 according to the invention in place of traditional grills, while the professional user may advantageously solve all the limitations of the known cooking apparatuses.

The cooking apparatus according to the present invention is provided with a cooking plate 26 for cooking food by contact which allows to carry out the cleaning and maintenance operations of the apparatus in a more simple and rational way and which permits to improve, or at least to equal, the cooking quality achieved by the professional kitchens.

Moreover, the apparatus 20 according to the invention is easy to inspect and to maintain as a result of the removable mounting of the combustion chamber 25 and of its associated valvular devices 24.

Further objects achieved by the apparatus 20 according to the present invention are those to minimize the formation of surface encrustments and to allow the drainage, the collection and the removal of all cooking residues.

A further object achieved by the apparatus according to the invention is that it allows preparation of foods that could not be prepared on known cooking grills due to their limited size or their instability during cooking.

The apparatus 20 according to the invention achieves also the objects to obtain uniform heat distribution over the entire cooking surface 26 and, if desired by the user, to divide heating of the cooking surface 26 by means of more combustion chamber which can be selectively and separately heated.

It is well understood that modifications and variations may be made to the apparatus 20 forming the object of the present invention without departing however from the scope defined by the following claims with reference to the accompanying drawings and thence from the protection extent of the present industrial invention.

For example, the cooking surface 26 could also have an oval or quadrangular shape and it could include one or more portions provided with superficial grooves or undulations.

On the other hand, the cart 20 could be realized with a configuration and formed of materials which are differing from those described above.

Instead of the folding doors 50 used in the described embodiment of the present invention, sliding doors or doors which are removably fixed to the vertical stanchions 29 of the supporting frame can be used, or alternatively only one folding or sliding door can be used.

The invention claimed is:

1. An apparatus for cooking food by contact, comprising:
a combustion chamber having a bottom wall;
an inclined continuous cooking surface, the cooking surface forming a generally circular shape, the cooking surface having:
an underside; and
a front edge;
a recess located at the front edge of the cooking surface, the recess being adapted to dispose of cooking by-products from food heated on the cooking surface;
a burner configured to heat the underside of the continuous cooking surface, the burner being housed in the combustion chamber;
a portable gas fuel tank for supplying fuel to the burner;
an outer casing having the shape of a truncated cone;
a plurality of ventilation holes passing through the bottom wall of the combustion chamber, the plurality of ventilation holes being sized and shaped differently and located in different positions to supply outside air to the burner, so as to allow a selected gas combustion;
a tube in fluid communication with the recess;
a removable container in fluid communication with the tube, the container being adapted to store the cooking by-products from the food heated on the cooking surface, the container being positioned below the combustion chamber;
wherein the cooking by-products from the food heated on the cooking surface passes through the recess, through the tube, and stored in the removable container;
a peripheral raised frame formed by an inner strip obliquely raised from the cooking surface;
a flat outer strip attached to the peripherally raised frame; and
a plurality of holes passing through the outer strip for exhausting hot air from the combustion cooking chamber;
wherein the combustion chamber is defined by a peripheral sheet having a shape of a truncated cone having a top end and a bottom end, which, at the top end, is closed by the cooking surface and, at the bottom end, is closed by the bottom wall;
wherein the continuous cooking surface, the combustion chamber and the burner form a cooking unit that is removably mounted on a supporting cart suited to house the portable gas fuel tank and to allow the use of the apparatus either in an indoor or in an outdoor environment;
wherein the peripheral raised frame is configured to fit within the combustion chamber; and
wherein the combustion chamber is configured to fit within the outer casing.

2. The apparatus according to claim 1, further comprising:
thread seats disposed in the underside of the continuous cooking surface; and
screw systems for connecting the bottom wall of the combustion chamber to the thread seats;
whereby the combustion chamber may be easily removed from the apparatus by removing the screw systems.

3. The apparatus according to claim 1, wherein the gas burner is constructed of chromed steel having a tubular cross-section, the gas burner extending in a substantially circular shape.

4. The apparatus according to claim 1, wherein the cooking surface comprises:
wherein the cooking surface is inclined toward the recess at an angle ranging from about 1° to about 2° with respect to a horizontal plane.

5. The apparatus according to claim 1, wherein the cart comprises:
an upper annular element having a radially extending upper rim;
a lower disk-shaped plate;
a stanchion coupled between the upper annular element and the lower disk-shaped plate;
a circular handle coupled to the upper annular element;
at least one support tray having an inner curvilinear edge, the support tray being configured to be supported by the underneath surface of the upper rim and the upper surface of the circular handle.

6. The apparatus according to claim 5, wherein the cart is made of stainless steel.

7. The apparatus according to claim 5, wherein the cart further comprises:
 two doors having semi-circular cross-sections, each of the doors being hingedly coupled to the stanchion, the doors being movable between a closed position defining a cylindrical enclosure, and an open position allowing access to the portable gas fuel tank.

8. The apparatus according to claim 1, further comprising:
 two doors operably associated with the cart, each of the doors having semi-circular cross-section, the doors being movable between a closed position defining a cylindrical enclosure, and an open position allowing access to the portable gas fuel tank.

9. The apparatus according to claim 8, further comprising:
 at least one ventilation hole in the cart for allowing fresh air to flow toward the burner when the doors are in the closed position.

* * * * *